United States Patent
Cho et al.

(10) Patent No.: US 7,876,790 B2
(45) Date of Patent: Jan. 25, 2011

(54) APPARATUS AND METHOD FOR PERFORMING TIME SYNCHRONIZATION USING GPS INFORMATION IN COMMUNICATION SYSTEM

(75) Inventors: Jae-Hun Cho, Suwon-si (KR); Seong-Taek Hwang, Pyeongtaek-si (KR); Byung-Duck Cho, Seoul (KR); Yun-Je Oh, Yongin-si (KR)

(73) Assignee: Samsung Electronics Co., Ltd., Maetan-Dong, Yeontong-Gu, Suwon-Si, Gyeonggi-Do (KR)

( * ) Notice: Subject to any disclaimer, the term of this patent is extended or adjusted under 35 U.S.C. 154(b) by 292 days.

(21) Appl. No.: 12/062,557

(22) Filed: Apr. 4, 2008

(65) Prior Publication Data
US 2009/0168808 A1 Jul. 2, 2009

(30) Foreign Application Priority Data
Apr. 4, 2007 (KR) .................. 10-2007-0033249

(51) Int. Cl.
*H04J 3/06* (2006.01)
(52) U.S. Cl. .................................... 370/503
(58) Field of Classification Search ............... 370/503, 370/509, 510
See application file for complete search history.

(56) References Cited

U.S. PATENT DOCUMENTS

| 3,971,068 | A  | * | 7/1976  | Gerhardt et al. ........... 382/270 |
| 5,513,388 | A  | * | 4/1996  | Suganuma .................. 455/258 |
| 2004/0054821 | A1 | * | 3/2004 | Warren et al. .................. 710/8 |
| 2006/0280182 | A1 | * | 12/2006 | Williams et al. ............. 370/394 |

FOREIGN PATENT DOCUMENTS

| JP | 2002-164837 | 6/2002 |
| KR | 2002-62798 | 7/2002 |

* cited by examiner

*Primary Examiner*—Derrick W Ferris
*Assistant Examiner*—Mohammad Anwar
(74) *Attorney, Agent, or Firm*—Cha & Reiter, LLC

(57) ABSTRACT

Disclosed is an apparatus and a method for performing time synchronization by using Global Positioning System (GPS) information in a communication system. The apparatus comprises a grand-master node having a GPS receiver, for generating a synchronizing message required to synchronize time on slave nodes by using Time Of Day (TOD) information received from the GPS receiver and at least one slave node for receiving the synchronizing message required to synchronize time from the grand-master node or from another slave node, for carrying out time synchronization operation by using an Offset and Frequency Compensation Clock (OFCC) synchronization process supporting time offset and frequency separation compensation, and for generating a synchronizing message required to synchronize time on other slave nodes.

21 Claims, 10 Drawing Sheets

APPARATUS AND METHOD FOR PERFORMING TIME SYNCHRONIZATION USING GPS INFORMATION IN COMMUNICATION SYSTEM

CLAIM OF PRIORITY

This application claims the benefit of the earlier filing date, under 35 U.S.C. §119(a), to that patent application entitled "Apparatus and Method for Performing Time Synchronization using GPS Information in Communication System" filed in the Korean Intellectual Property Office on Apr. 4, 2007 and assigned Serial No. 2007-33249, the contents of which are hereby incorporated by reference.

BACKGROUND OF THE INVENTION

1. Field of the Invention

The present invention relates to Global Positioning System and more particularly, to an apparatus and a method for synchronizing the time on peripheral nodes that are not equipped with GPS receivers by using Global Positioning System (GPS) information of a node equipped with a GPS receiver in a communication system.

2. Description of the Related Art

In general, GPS service refers to a service wherein upon receiving GPS signals transmitted from at least three GPS satellites, accurate time and distance are determined from the received GPS signals. That is, with three distances different from one another measured by a triangulation method, a user is provided information regarding their current position. In addition, by further using data, such as a map or a traffic report, etc., the above GPS is frequently used as a navigation service in which when a user selects a specific destination, the combination of navigation information, such as transportation information or information on guidance of the roads, etc., and the position of the user may be used to provide appropriate turn-by-turn directions to the selected destination Also, the above GPS is being applied to the field of geodetic survey and surveying, military purpose, aeronautical navigation control, and the like.

In a wireless communication network, synchronization of a system or a network is an essential element. At present, as a method for synchronizing a wireless communication network, a synchronization method using a OPS satellite corresponds to a representative method, and in order to receive a GPS signal, point-to-point topology between a receiver and the GPS satellite is employed.

FIG. 1 is a configuration block diagram illustrating a general GPS receiver. The GPS receiver uses information of GPS satellites with a view to time synchronization uses, as reference, an input of 8 kHz signal synchronized with a GPS signal or GPS one (1) Pulse Per Second (1 PPS), and performs the function for providing a system with 10 MHz signal, a Pulse Per 2 Second (PP2S) signal, and an 1 PPS signal.

To examine the respective configurations in more detail with reference to FIG. 1, the GPS receiver 10 includes an antenna interface 110, Field-Programmable Gate Array (FPGA) 120, a GPS receiver 130, a Central Processing Unit (CPU) 140, an oscillator 150, and an input/output unit 160.

The antenna interface 110 performs the function of providing a 1 PPS signal synchronized with Universal Coordinated Time (UCT) on receiving a signal L1 from a GPS receiving antenna, and the function for checking a physical connection state with the GPS receiving antenna to report the checked physical connection state to a system.

The FPGA 120 includes an alarm detector 121, a multiplexer 125, a phase error detector 122, a discrete input/output interface 123, and a CLocK (CLK) and timing generator 124. Herein, the alarm detector 121 performs the function for determining if an output of each Voltage Controlled Oscillator (VCO) in the GPS receiver 10 exists, if power is normally supplied in the GPS receiver 10, etc., and reporting the determination to the CPU 140. The multiplexer 125 receives 8 kHz signal synchronized with the GPS 1 PPS signal and an external 1 PPS signal. The phase error detector 122 receives an output of the multiplexer 125 selected according to a selection control signal, and inspects a phase error of the received output signal of the multiplexer 125. The discrete input/output interface 123 performs an input/output operation of error signals among the CLK and timing generator 124, the phase error detector 122, and the alarm detector 121. The CLK and timing generator 124 generates an 1 PPS and PP2S output signals by using a GPS signal or a synchronized 10 MHz clock.

The GPS receiver 130 processes the GPS signal received by the antenna interface 110, and provides the GPS 1 PPS signal to the FPGA 120.

The CPU 140 controls each of the configuration elements of the GPS receiver 10 during a GPS receiving operation, and reports a current reception state of the GPS receiver 10 to the system on sensing an alarm reported by the alarm detector 121. The above reception state can be set to either a Function Failure (FF) state, a Power Failure (PF) state, a normal state, an abnormal state, or a holdover state.

The oscillator 150 is constructed by an Oven Controlled X-tal (crystal) Oscillator (OCXO) or a Temperature-Compensated X-tal (crystal) Oscillator (TCXO), and provides an output signal having an oscillation frequency that is mechanically and physically stable. The OCXO uses characteristics with which a crystal susceptibly changes in response to temperature, and employs a method in which the temperature around the crystal is constantly maintained by using an oven so that no error can occur. Even if the OCXO has better accuracy than any other product to which the crystal is applied, it is bulky and uses various sources of electricity, including 12, 24, and 30 Volts. It is mainly used for a repeater or military use, such as in a missile, a satellite, and the like, rather than Personal Communication Service (PCS). Since TCXOs are less expensive than the OCXOs, they are used in many general purpose GPS receivers. In order to improve the operation performance of the crystal, the TCXO employs a temperature compensation circuit, a thermistor, and a VCO. The temperature compensation circuit puts a limitation on the output frequency variation of the TCXO according to an operation temperature change. The thermistor reduces an oscillation frequency error of an oscillator fluctuation according to temperature. The VCO has high frequency stability in relation to temperature changes ranging from several MHz to dozens of MHz, and is extensively used as reference frequency sources.

By supplying a user with a Universal Asynchronous Receiver/Transmitter (UART) port including a debug port and a Time Of Day (TOD), the input/output unit 160 not only enables the user to monitor current TOD data in real-time by using the TOD port, but also can provide the function of remote control and download.

On the basis of predetermined reference, e.g., midnight, Jan. 6, 1980, the TOD begins to count from the first GPS 1 PPS, and by giving notice in what order a currently received 1 PPS is counted, an accurate time information through this count operation can be provided. Also, since the 1 PPS corresponds to an exact timing signal, respective nodes synchronize all clocks employed in a system with the 1 PPS signal.

A synchronization method of a prior wireless communication network uses a scheme in which the GPS information is received from the GPS satellites by the GPS receiver equipped as described above, and the synchronization is implemented with the received information. However, in the case of either a multistory building, an urban downtown with many obstacles, or indoor where it is difficult to receive the GPS signals, it is difficult for the above scheme to receive the GPS information from the GPS satellites, and therefore, problems can be raised in the synchronization of a system.

SUMMARY OF THE INVENTION

Accordingly, the present invention provides an apparatus and a method for synchronizing the time on slave nodes that are not equipped with GPS receivers by using GPS information of a node equipped with a GPS receiver in a communication system.

In accordance with an aspect of the present invention, there is provided an apparatus for performing time synchronization by using Global Positioning System (GPS) information in a communication system, including a grand-master node having a GPS receiver, and for generating a synchronizing message required to synchronize time on slave nodes by using Time Of Day (TOD) information received from the GPS receiver and at least one slave node for receiving the synchronizing message required to synchronize time from the grand-master node or from another slave node, for carrying out time synchronization operation by using an Offset and Frequency Compensation Clock (OFCC) synchronization process supporting time offset and frequency separation compensation, and for generating a synchronizing message required to synchronize time on other slave nodes.

In accordance with another aspect of the present invention, there is provided a method for performing time synchronization by using Global Positioning System ((PS) information in a communication system, including the steps of generating a synchronizing message required to synchronize time on slave nodes by using Time Of Day (TOD) information that a grand-master node having a GPS receiver receives from a GPS receiver and transmitting the generated synchronizing message to at least one slave node; and receiving, by the slave node, the synchronizing message required to synchronize time from a grand-master node or from another slave node, carrying out time synchronization operation by using an Offset and Frequency Compensation Clock (OFCC) synchronization process supporting time offset and frequency separation compensation and generating a synchronizing message required to synchronize time on other slave nodes.

BRIEF DESCRIPTION OF THE DRAWINGS

The above and other exemplary features, aspects, and advantages of the present invention will be understood from the following detailed description taken in conjunction with the accompanying drawings, in which.

DETAILED DESCRIPTION OF THE INVENTION

Exemplary embodiments of the present invention will be described in detail with reference to the accompanying drawings. The description includes particulars, such as specific configuration elements, which are provided to facilitate more comprehensive understanding of the present invention, and it will be understood to those of ordinary skill in the art that prescribed changes in form and modifications may be made to the particulars in the scope of the present invention. For the purposes of clarity and simplicity, a detailed description of known functions and configurations incorporated herein is omitted as it may make the subject matter of the present invention unclear.

The present invention refers to a method for performing time synchronization by using a Global Positioning System ("GPS") information in a communication system. Particularly, an embodiment of the present invention proposes a scheme which under an Ethernet system, receives a signal of a node equipped with a GPS receiver, processes the received signal, and then synchronizes the time on nodes that are not equipped with UPS receivers.

An apparatus for performing time synchronization by using UPS information according to an embodiment of the present invention includes a grand-master node and at least one slave node. To subdivide the configuration thereof, the grand-master consists of an integrated grand-master node which has a UPS receiver, and in which a time synchronization device and the OPS receiver are configured in the form of one body; and an add-on grand-master node in which the GPS receiver and the time synchronization device are configured in a separated form. Also, the slave node is classified into a slave node that includes a TCXO, and another slave node that does not include a TCXO.

Time synchronization technology is based on IEEE 1588 standard, but Offset and Frequency Compensation Clock (OFCC) synchronization technology in which more improved jitter variation values can be obtained in a multi-hop environment is applied to the present invention. The above OFCC technology is based on Korea Patent Application No. 10-2006-0039606 filed on May 2, 2006 (applicant:

Samsung Electronics Co., Ltd.). OFCC technology that the present invention refers to will be separately described afterwards.

Figure 1:
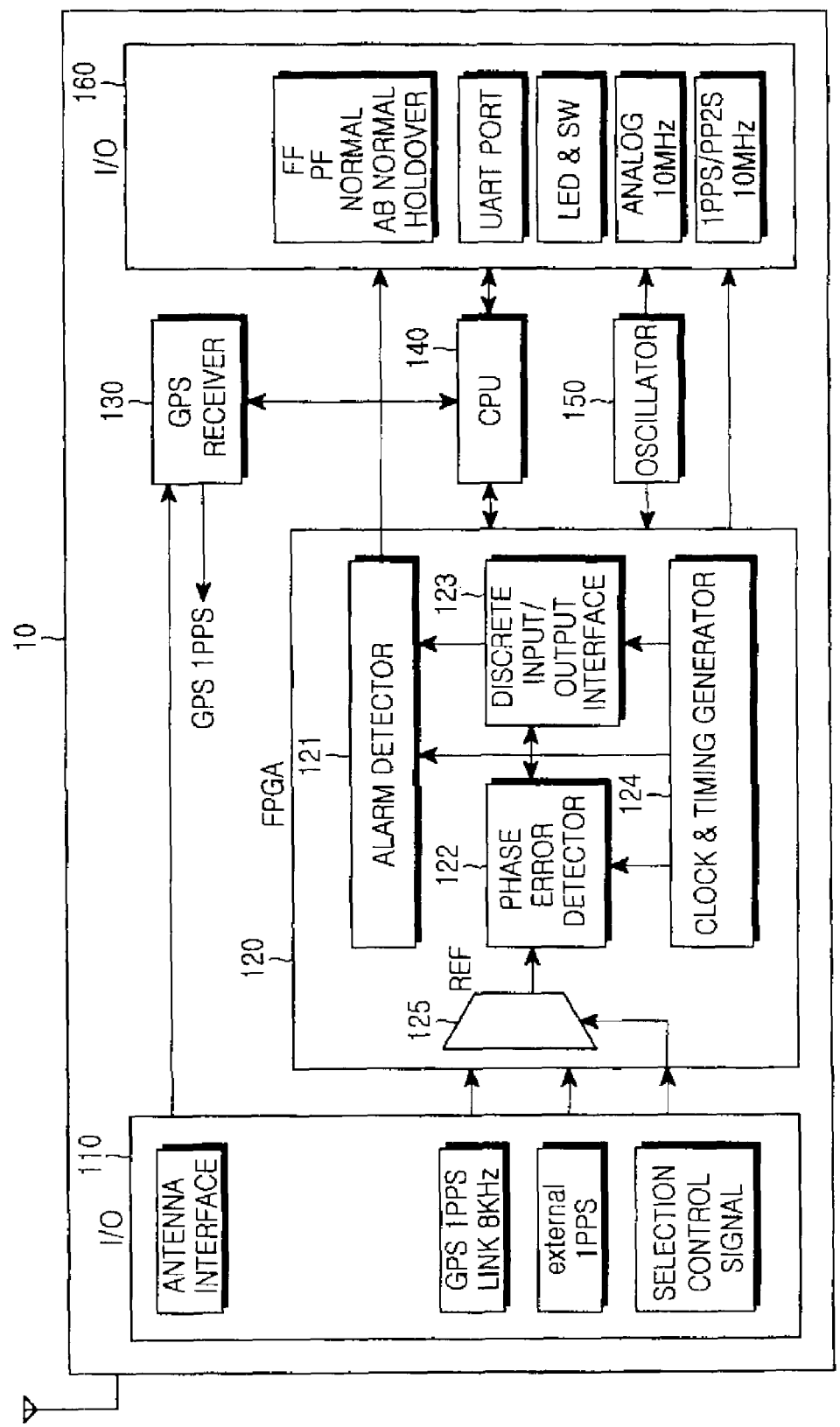
FIG. 1 is a configuration block diagram illustrating a general GPS receiver.
Figure 2:
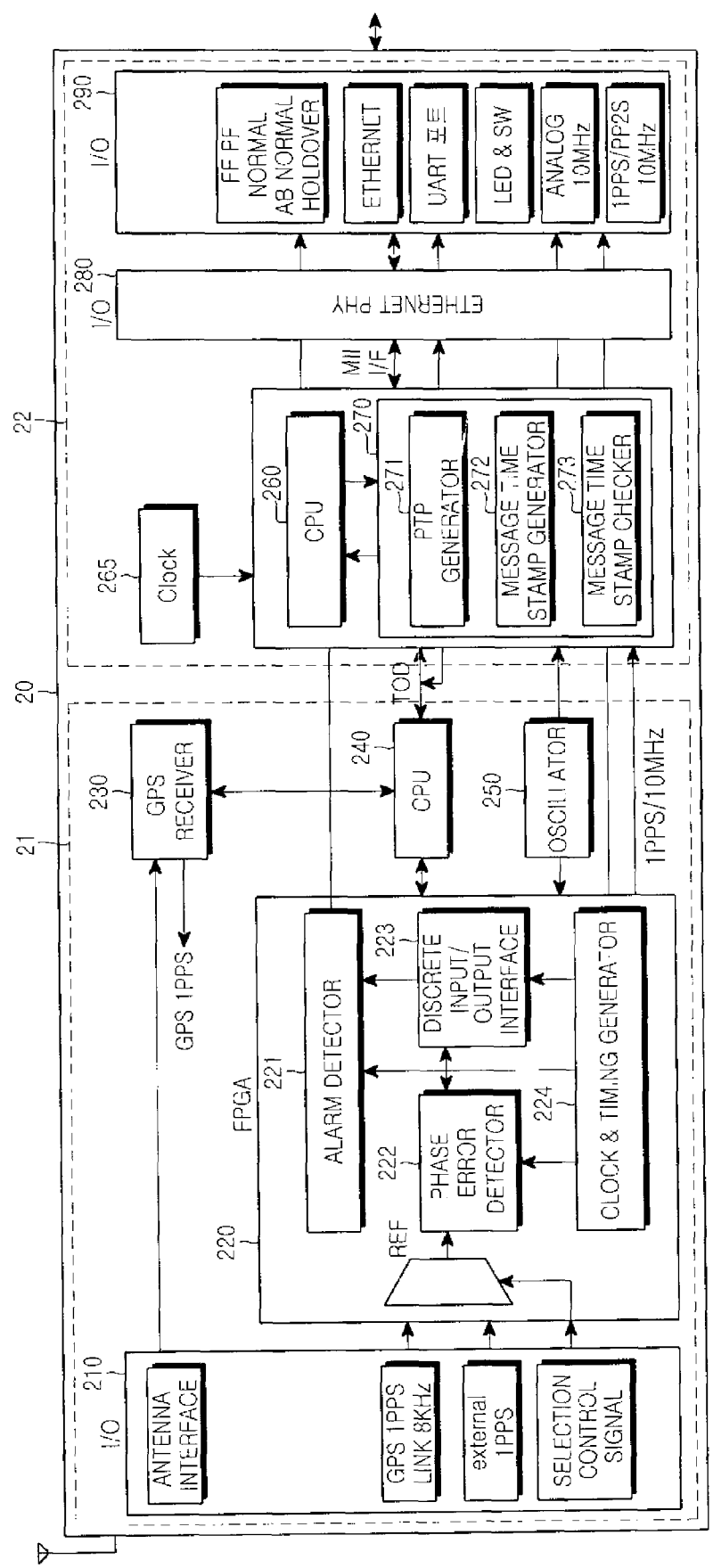
FIG. 2 is a configuration block diagram illustrating an integrated grand-master node according to an embodiment of the present invention.

FIG. 2 is a configuration block diagram illustrating an integrated grand-master node according to an embodiment of the present invention. The integrated grand-master node illustrated in FIG. 2 corresponds to a configuration in which an apparatus for performing time synchronization according to the present invention is added to the GPS receiver illustrated in FIG. 1. Hence, the integrated grand-master node illustrated in FIG. 2 provides the same signals, including the 10 MHz, PP2S and 1 PPS signals, and the UART port having the debug and TOD ports as the general GPS receiver illustrated in FIG. 1 provides.

With reference to FIG. 2, the integrated grand-master node 20 according to an embodiment of the present invention is configured to include a GPS receiving apparatus unit 21 and a time synchronization apparatus unit 22. The GPS receiving apparatus unit 21 has the same configuration as that of the above-mentioned GPS receiver 10 illustrated in FIG. 1.

The apparatus for performing time synchronization according to the present invention is configured in the form of an FPGA. The apparatus for performing time synchronization according to the present invention includes a Precision Time Protocol (PTP) generator 271, a time stamp generator 272, a time stamp checker 273, and a CPU 260. The PTP generator 271 receives TOD information transmitted from the GPS receiver, and encapsulates the received TOD information in a PTP scheme. The time stamp generator 272 produces a time stamp for a time synchronization operation according to the IEEE 1588 standard. The time stamp checker 273 processes time-stamped information. The CPU 260 controls each of configuration elements during a time synchronization operation. In addition, the time synchronization apparatus unit 22 includes a clock for providing a synchronizing signal generated by the integrated grand-master node 20 itself. Also, an Ethernet PHY 280, alias an Ethernet physical layer or an Ethernet transceiver, includes an Ethernet standard interface.

With reference to the abovementioned configuration of the integrated grand-master node, a description will be made of a synchronization operation of the integrated grand-master node.

In the integrated grand-master node 20 according to an embodiment of the present invention, the GPS receiving apparatus unit 21 performs the same operation as the general GPS receiver, and provides GPS information to the time synchronization apparatus unit 22. The time synchronization apparatus unit 22 uses information received by the GPS receiver, and performs a time synchronization operation.

To describe in detail, if a CPU 240 of the GPS receiving apparatus unit 21 delivers TOD information to an FPGA 270 of the time synchronization apparatus unit 22, the TOD information is encapsulated by the PTP generator 271 in the PTP scheme according to control of the CPU 260 in the time synchronization apparatus unit 22, and the time stamp generator 272 generates a time stamp according to the IEEE 1588 standard. A synchronizing message passing through the PTP generator 271 and the time stamp generator 272 is transmitted to a slave node through a communication network.

Figure 3:
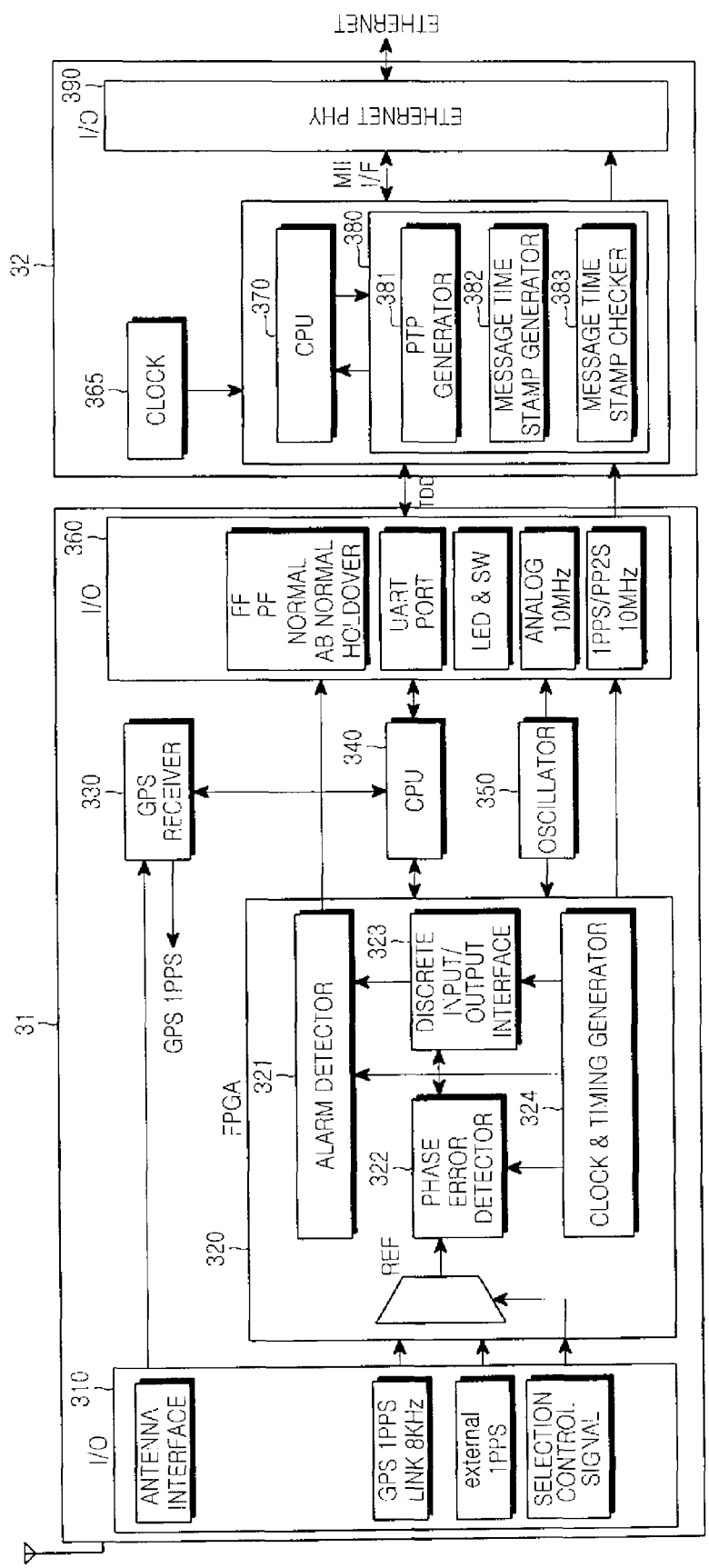
FIG. 3 is a configuration block diagram illustrating an add-on grand-master node according to an embodiment of the present invention.

FIG. 3 is a configuration block diagram illustrating an add-on grand-master node according to an embodiment of the present invention. Referring to FIG. 3, the add-on grand-master node according to an embodiment of the present invention includes an interface configured so as to receive the TOD information provided from the general GPS receiver via an RS-232 port. Thus, a GPS receiving apparatus unit 31 has the same configuration as that of the general GPS receiver 10, and a time synchronization apparatus unit 32 also has the same configuration as that of the time synchronization apparatus unit 22 of the integrated grand-master node 20. Also, a time synchronization procedure operates in the same manner.

Figure 4:
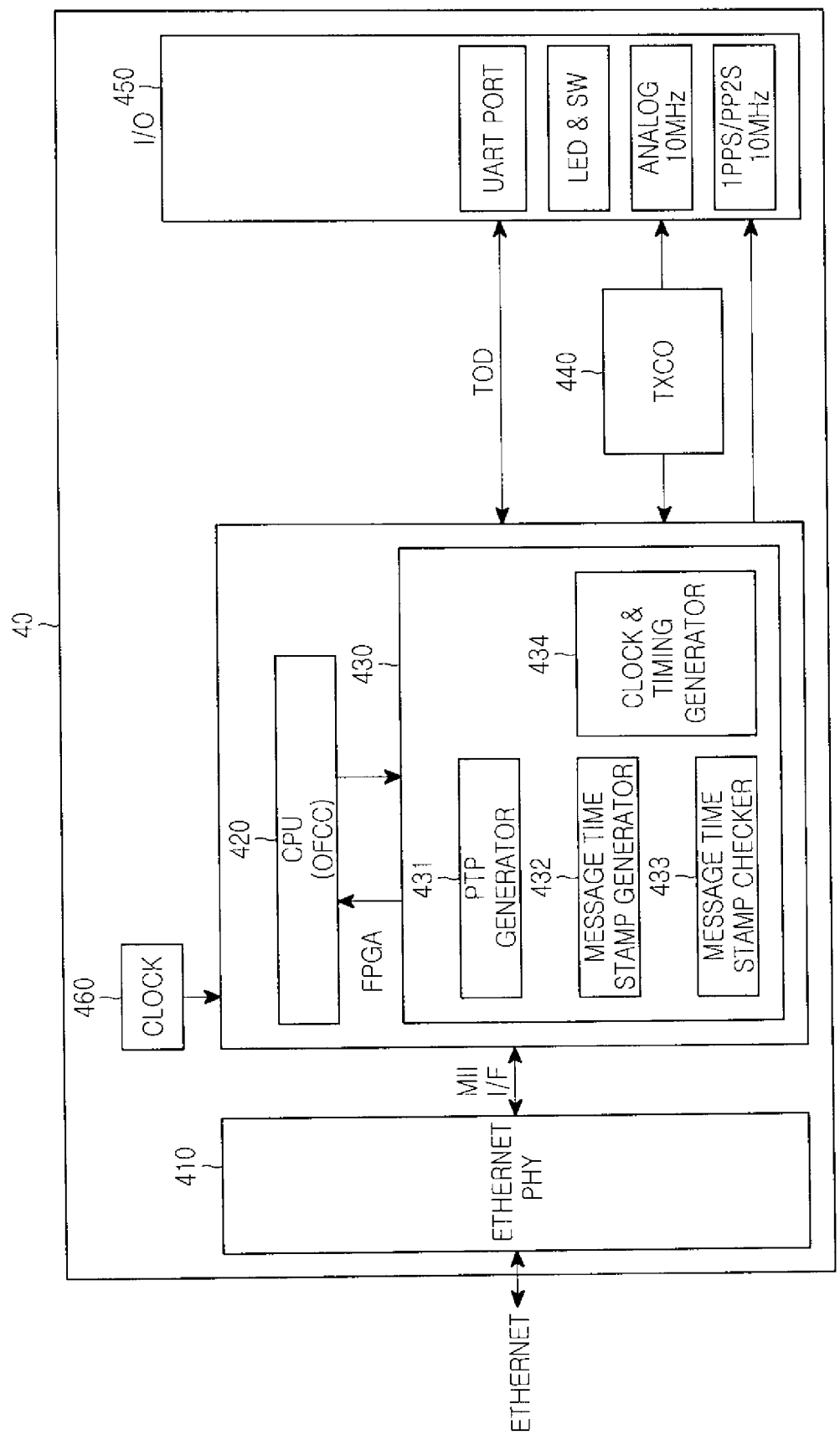
FIG. 4 is a configuration block diagram illustrating a slave node including a Temperature-Compensated Crystal Oscillator (TCXO) according to an embodiment of the present invention.

FIG. 4 is a configuration block diagram illustrating a slave node including a Temperature-Compensated Crystal Oscillator (TCXO) according to an embodiment of the present invention. With reference to FIG. 4, the slave node 40 including the TCXO according to an embodiment of the present invention includes a PTP generator 431, a time stamp generator 432, a time stamp checker 433, a clock 460, a clock and timing generator 434, the TCXO 440, an input/output unit 450, and a CPU 420. Herein, the PTP generator 431 receives TOD information transmitted from a grand-master node or another slave node, and encapsulates the received TOD information in the PTP scheme. The time stamp generator 432 generates a time stamp for a time synchronization operation according to the IEEE 1588 standard. The time stamp checker 433 processes time-stamped information of a synchronizing message received from the grand-master node or another slave node. The clock 460 provides a system synchronizing signal generated by the slave node 40 itself. The clock and timing generator 434 generates 1 PPS and PP2S output signals for time synchronization. The TCXO 440 provides an output signal having stable oscillation frequency. The input/output unit 450 outputs 10 MHz, 1 PPS and PP2S signals generated from the clock and timing generator 434, and an analog 10 MHz signal produced by the TCXO 440, and performs an operation for inputting/outputting TOD data by using a UART port. The CPU 420 controls each of configuration elements of the slave node 40 while the slave node 40 performs time synchronization operation, and carries out a time synchronization operation of the slave node with the OFCC synchronization technique.

With reference to the above configuration, a description will be made of an operation of the slave node including the TCXO according to an embodiment of the present invention. The slave node communicates with the grand-master node through a Ethernet-based PTP message. Also, in relation to this PTP message, a time stamp complying with the IEEE 1588 standard is generated from the time stamp generator 432 of the slave node, and then, time stamp information is processed by the time stamp checker 433. By using the time stamp information, the CPU 420 positioned in the FPGA of the slave node 40 goes through an operation process employing the OFCC technique to carry out a synchronization operation, and modifies the TOD information of the slave node. By using the TOD information, the FPGA enables a pulse to be generated once a second or once every 2 seconds, and produces 1 PPS signal or PP2S signal. The FPGA also uses an analog 10 MHz clock provided from the external TCXO 440, and can generate a digital 10 MHz clock.

Figure 5:
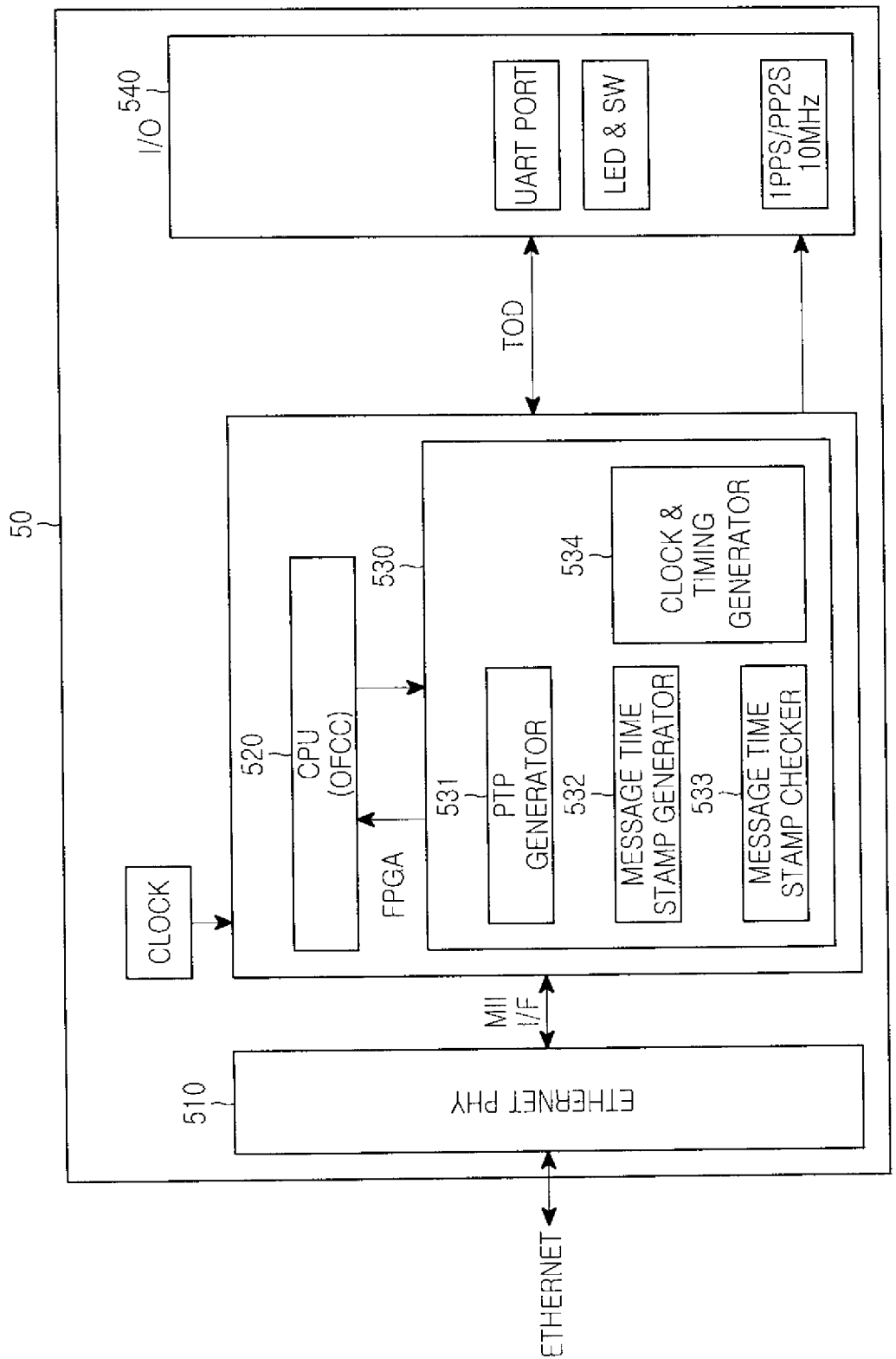
FIG. 5 is a configuration block diagram illustrating a slave node which does not include a TCXO according to an embodiment of the present invention.

FIG. 5 is a configuration block diagram illustrating a slave node which does not include a TCXO according to an embodiment of the present invention. Referring to FIG. 5, the slave node excluding the TCXO therefrom has the same configuration as that of another slave node illustrated in FIG. 4 except that the TCXO 440 is excluded from another slave node 40 illustrated in FIG. 4. Therefore, the slave node 50 which does not include the TCXO according to an embodiment of the present invention can internally provide a digital 10 MHz clock synchronized with 1 PPS signal or PP2S signal by an FPGA included in the slave node 50.

Also, since each slave node can operate as a master node of a neighboring slave node, a slave node serving as a master node of another slave node transmits/receives a PTP message to/from another subordinate slave node through Ethernet, and accomplishes multi-hop time synchronization.

Figure 6:
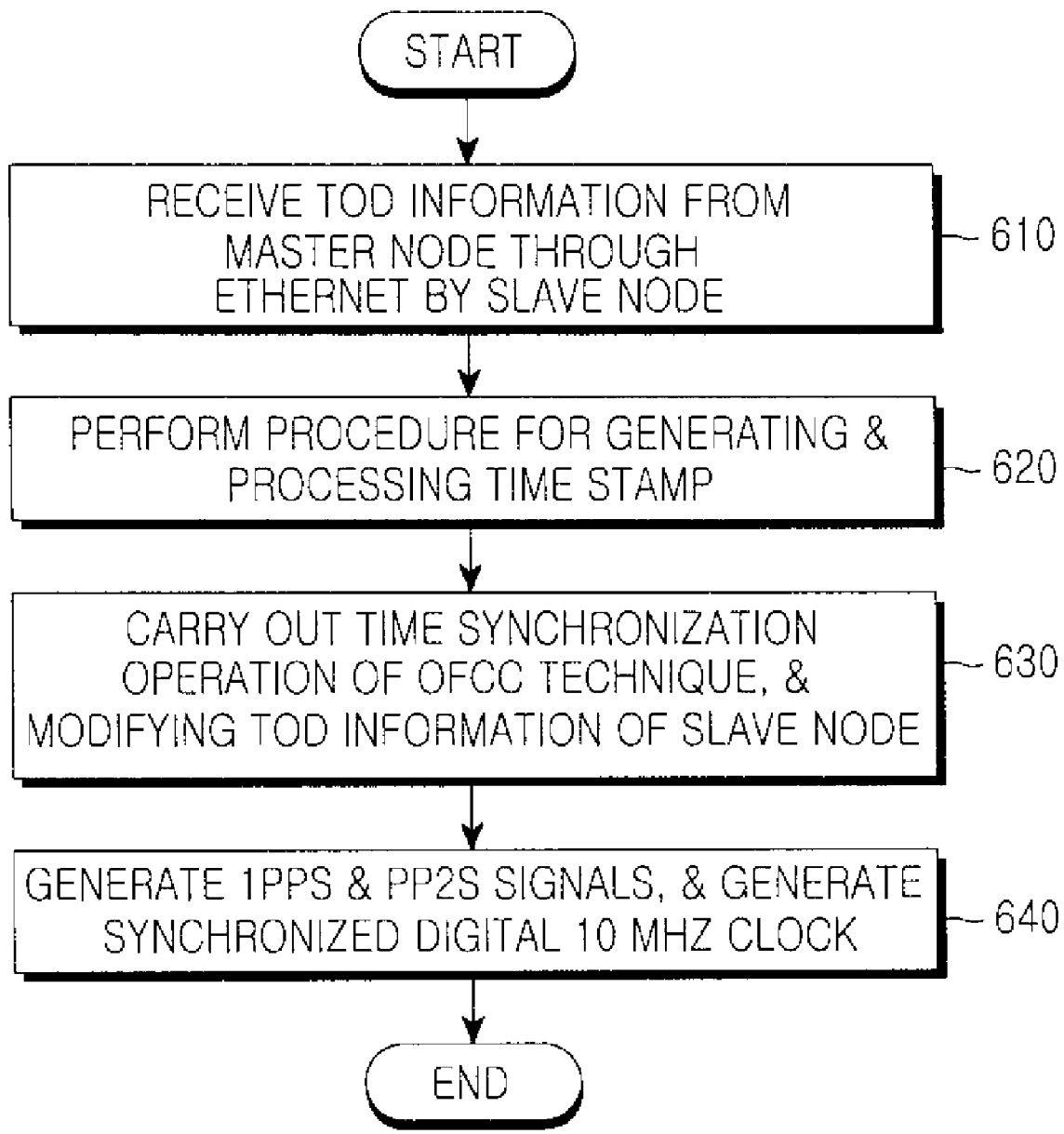
FIG. 6 is a flowchart illustrating a time synchronization operation of a slave node according to an embodiment of the present invention.

FIG. 6 is a flowchart illustrating a time synchronization operation of a slave node according to an embodiment of the present invention. With reference to FIG. 6, in step 610, the slave node receives TOD information for time synchronization in the form of a PTP message from a master node through an Ethernet network. The master node can be a grand-master node or another slave node. In step 620, in response to the received PTP message, the FPGA of the slave node performs a procedure for generating a time stamp and processing the time stamp according to the IEEE 1588 standard. In step 630, the CPU positioned in the FPGA of the slave node carries out a time synchronization operation by using the OFCC technique, and then modifies the TOD information of the slave node itself, In step 640, by using the above TOD information, the procedure enables a pulse to be generated once a second or once every 2 seconds, and enables 1 PPS signal or PP2S signal to be generated. Also, by using an analog 10 MHz clock provided from the TCXO, the procedure enables a digital 10 MHz clock to be generated.

Figure 7:
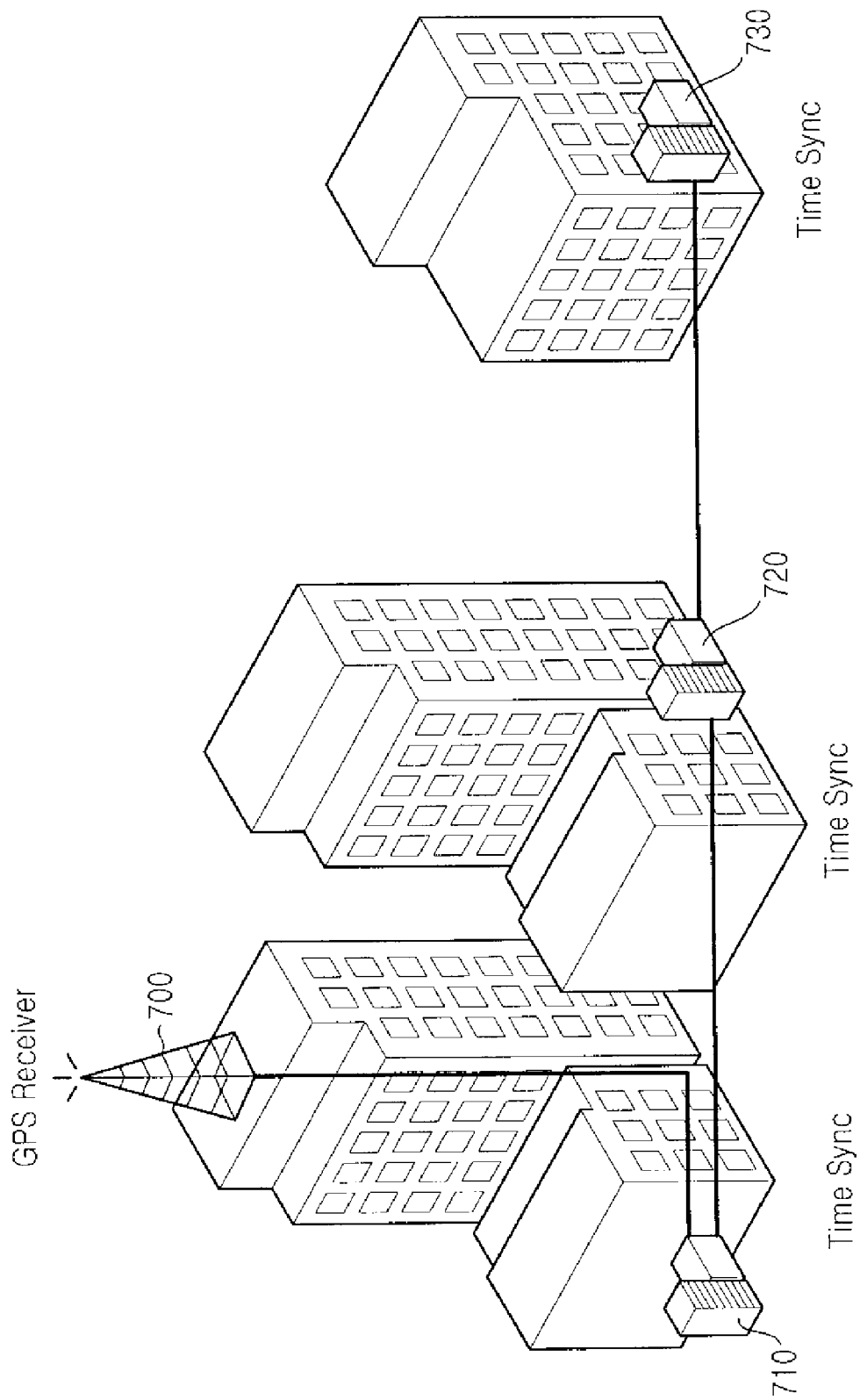
FIG. 7 is a view illustrating an example in which a time synchronization method according to an embodiment of the present invention is applied to a communication network.

FIG. 7 is a view illustrating an example in which a time synchronization method according to an embodiment of the present invention is applied to a communication network. In the case of a wireless communication network within a zone where buildings stand close together as in an urban area, a reception state of a GPS signal can be weak. However, with the application of the present invention, in a case where a GPS reception state is not good in establishing a small size base station or a repeater, or even in the case of an indoor condition, the small size base station or the repeater can be established. Since many small size base stations or many repeaters 710, 720 and 730 hold information of a node 700 equipped with a GPS receiver in common, it is cost-effective in an aspect of expenses.

Figure 8:
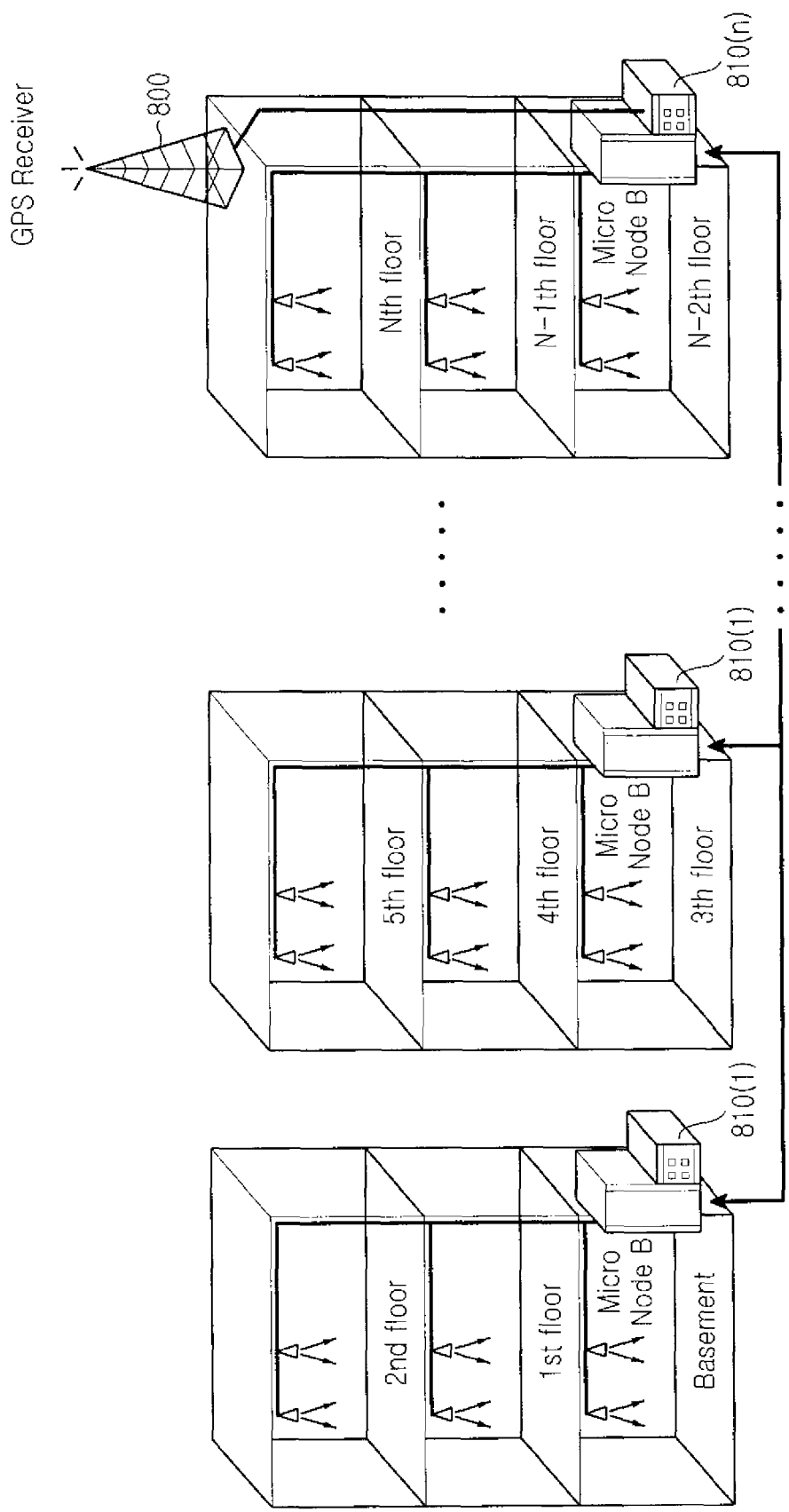
FIG. 8 is a view illustrating an example in which a time synchronization method according to an embodiment of the present invention is applied to a communication network.

FIG. 8 is a view illustrating an example in which a time synchronization method according to an embodiment of the present invention is applied to a communication network. With reference to FIG. 8, because it is difficult to receive a GPS signal in the case of the inside of a building, each repeater goes through the difficulty of time synchronization. However, with the application of the present invention, as respective repeaters 810 having no GPS receivers are positioned outside of the buildings, receiving a GPS signal for time synchronization from a GPS receiver 800 established at a spot where it is easy to receive GPS information enables time synchronization of respective repeaters 810 positioned inside of the buildings to be ensured.

Figure 9:
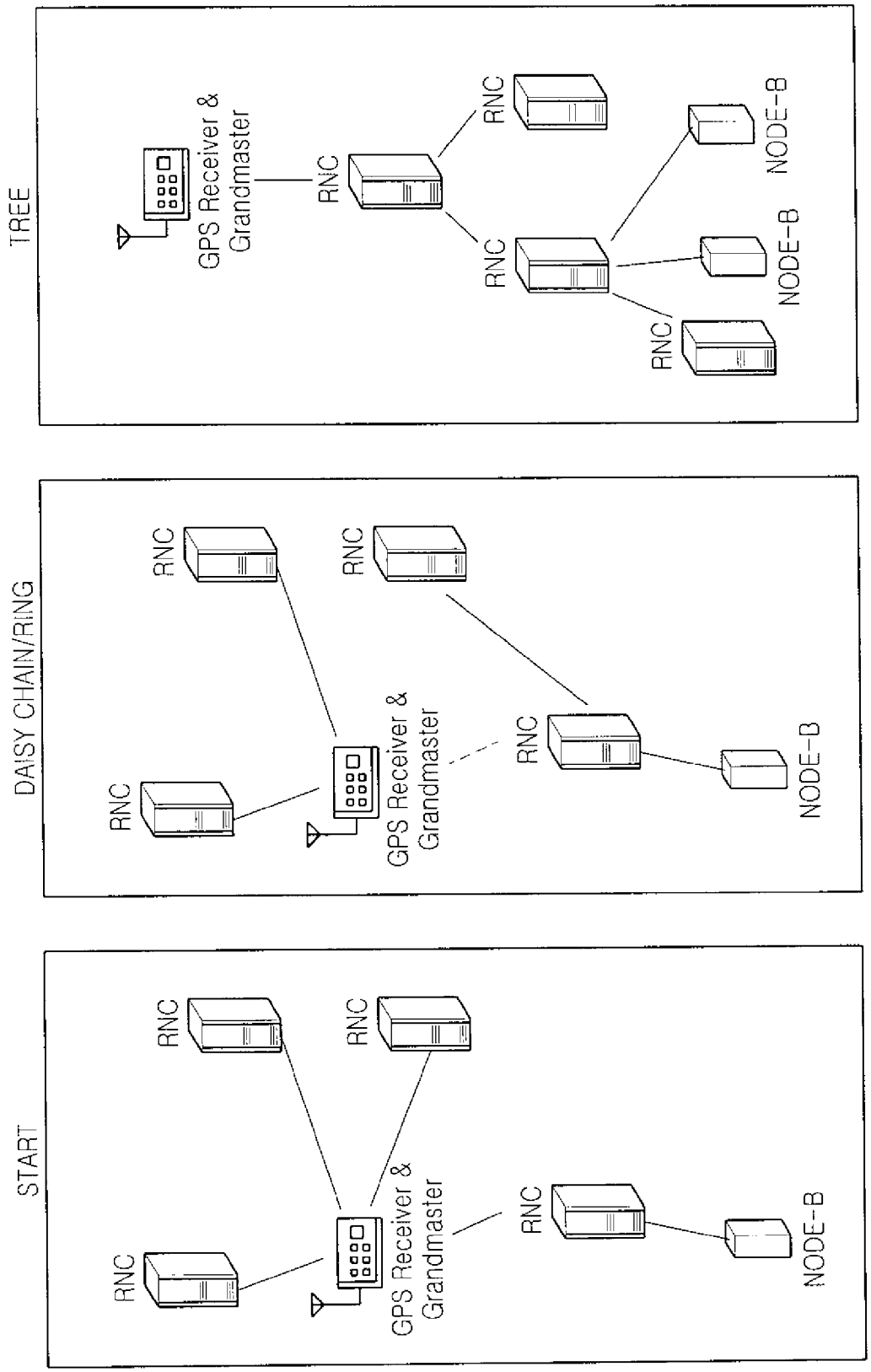
FIG. 9 is a view illustrating an example in which a time synchronization method according to an embodiment of the present invention is applied to a Wideband Code Division Multiple Access (WCDMA) system.

FIG. 9 is a view illustrating an example in which a time synchronization method according to an embodiment of the present invention is applied to a Wideband Code Division Multiple Access (WCDMA) system. Referring to FIG. 9, it corresponds to a case where synchronization technology is applied to the network synchronization of a Radio Network Controller (RNC) or an NODE-B in a WCDMA network. Since synchronization technology according to an embodiment of the present invention takes an Ethernet-based operation, point-to-point access is maintained. However, if the synchronization technology according to an embodiment of the present invention is applied to a WCDMA communication system, it is possible to use the synchronization technology for the synchronization of a communication network in various topology forms, such as a star, a daisy chain, a ring, a tree, and the like.

Figure 10:
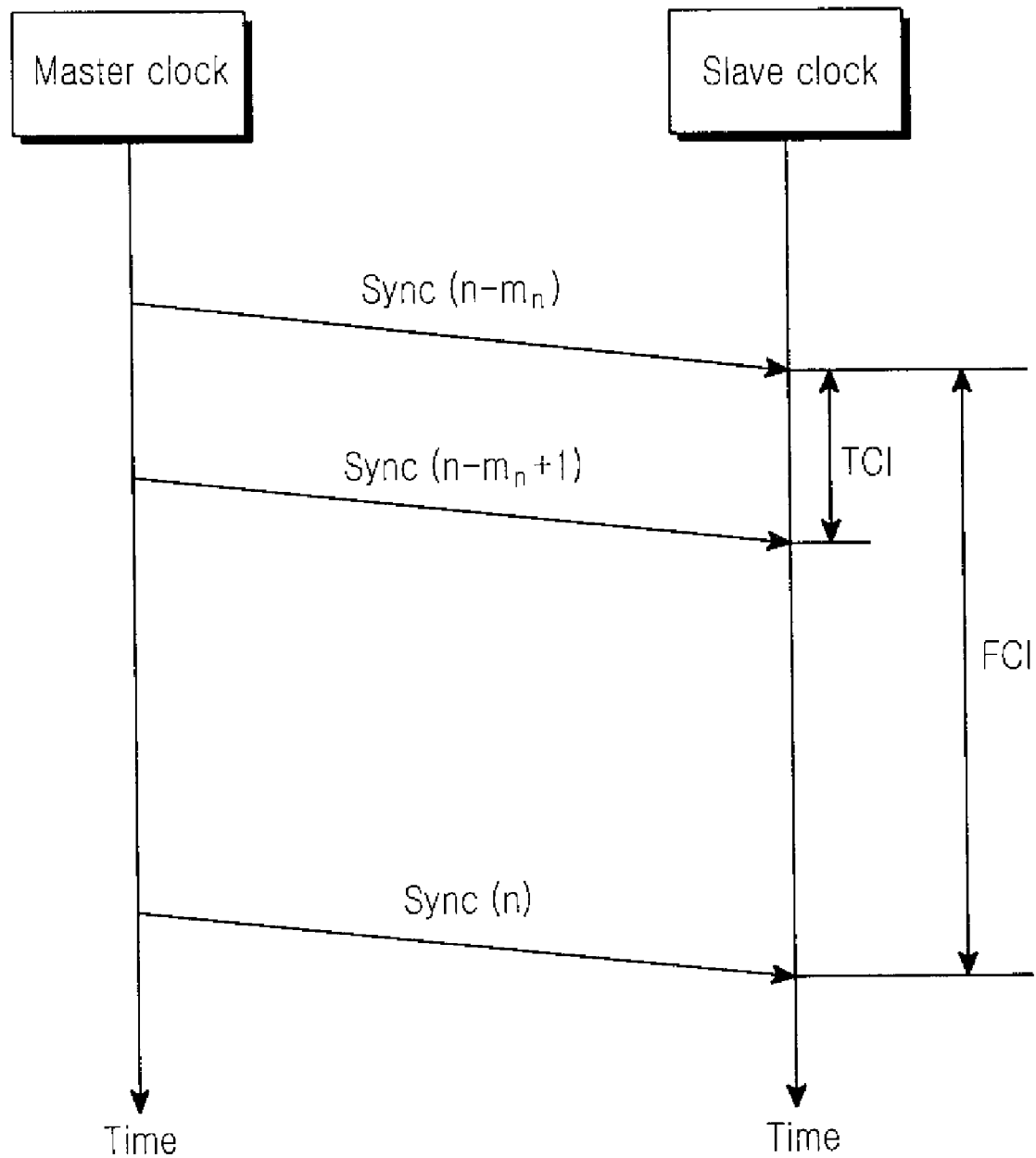
FIG. 10 is a flowchart illustrating a basic operation procedure depicting time offset and a frequency compensation interval for Offset and Frequency Compensation Clock (OFCC) time synchronization.

A description will be made of the OFCC synchronization scheme employed in the present invention. The OFCC synchronization scheme uses a method that is improved in order to support time offset and frequency separation compensation instead of prior time offset and frequency concurrent combination compensation. FIG. 10 is a flowchart illustrating a basic operation procedure depicting time offset and a frequency compensation interval for Offset and Frequency Compensation Clock (OFCC) time synchronization. To describe the present invention in more detail referring to FIG. 10, in the time synchronization scheme according to an embodiment of the present invention, a master clock periodically transmits a synchronizing message Sync including the launching time of the master clock itself to a slave clock, thereby performing an operation for time synchronization at definite periods. Then, the present invention uses, as it is, a basic procedure of the IEEE 1588 standard including the synchronizing message Sync, a follow-up message, a delay request message, and delay response message. In addition, a frequency update scheme in the slave clock is improved in order to support the time offset and frequency separation compensation according to the features of the present invention in place of the prior time offset and frequency concurrent combination compensation.

Namely, in the present invention, two intervals, i.e. a Time offset Compensation Interval (TCI) and a Frequency Compensation Interval (FCI), according to a synchronization cycle exist, and an operation for time offset compensation and frequency compensation is performed at a period according to a relevant interval. The TCI corresponds to a space between two synchronizing messages adjacent to each other. Herein, the FCI is longer than the TCI, and for example, can be set to a multiple number of TCIs.

Definitions of the TCI and the FCI are illustrated in FIG. 10. In FIG. 10, 'm' represents the ratio FCI:TCL. The parameter "m" can be set in order to be dependent on time, but in a more simple way, the value of "m" can be set to a suitably fixed number in advance.

In this manner, corresponding to the above two intervals, i.e. TCI and FCI, in the present invention a scheme for finding two frequency scaling coefficients is provided as an operation procedure for the slave clock.

1. Time Offset Compensation Interval (TCI)

Once the slave clock receives the synchronizing message, the slave clock uses the received synchronizing message to update its frequency only for time offset compensation by using a scheme for computing a frequency scaling coefficient FreqScaleFactor, defined as.

$$\text{FreqScaleFactor}_n = \text{MasterClockCount}_n / \text{SlaveClockCount}_n \quad (1)$$

In equation (1), FreqScaleFactor$_n$ represents a frequency scaling coefficient, MasterClockCount$_n$=MasterClockTime$_n$−MasterClockTime$_{n-1}$, MasterClockTime$_n$=MasterSyncTime$_n$+MasterToSlaveDelay, MasterSyncTime$_n$ represents the time the master clock transmits a synchronizing message to the slave clock, MasterToSlaveDelay represents the transmission delay time when the master clock transmits a synchronizing message to the slave clock, SlaveCtockCount$_n$=SlaveClockTime$_n$−SlaveClockTime$_{n-1}$, and SlaveClockTime$_n$ represents the time the slave clock receives the synchronizing message from the master clock.

2. Frequency Compensation Interval (FCI)

Once a synchronizing message (i.e., a current synchronizing message) that the slave clock receives for the n$^{th}$ time from a point in time of previous frequency and time offset concurrent compensation according to features of the present invention nth corresponds to the mn$^{th}$ synchronizing message, the slave clock updates the its frequency for both time offset compensation and frequency compensation by using a scheme for computing a frequency scaling coefficient, as $$FreqScaleFactor_n = \frac{\sum_{i=n-m_n+1}^{n} MasterClockCount_i}{\sum_{i=n-m_n+1}^{n} SlaveClockCount_i} + \frac{ClockDiffCount_n}{SlaveClockCount_n} \quad (2)$$

In equation (2), FreqScaleFactor, represents a frequency scaling coefficient,

MasterClockCount$_n$=MasterClockTimen−MasterClock-Timen$^{-1}$,

MasterClockTimen=MasterSyncTimen+MasterTo-SlaveDelay

MasterSyncTimen represents the time the master clock transmits a synchronizing message to the slave clock, MasterToSlaveDelay represents the transmission delay time when the master clock transmits a synchronizing message to the slave clock, SlaveClockCoun$_n$=SlaveClockTimen−SlaveClock Timen$^{-1}$, SlaveClockTimen represents the time the slave clock receives the synchronizing message from the master clock, ClockDiffCount$_n$=MasterClockTimen−SlaveClockTimen.

If the 'm' corresponds to a preset constant and is independent of time, equation (2) becomes:

$$FreqScaleFactor_n = \frac{\sum_{i=n-m+1}^{n} MasterClockCount_i}{\sum_{i=n-m+1}^{n} SlaveClockCount_i} + \frac{ClockDiffCount_n}{SlaveClockCount_n} \quad (3)$$

In equation (3), respective parameters are defined as previously described.

Since the time synchronization scheme according to the above OFCC synchronization scheme renders the frequency and time offset of a slave node separately compensated by using the scheme supporting time offset and frequency separation compensation, most errors accumulated along a synchronization route from a grand-master node to a slave node can be compensated in a network having phased bridges (i.e., switches).

The merits and effects of exemplary embodiments, as disclosed in the present invention, and as so configured to operate above, will be described as follows.

As described above, according to an apparatus and a method for performing time synchronization by using GPS information in an Ethernet system proposed in the present invention, even a Base Station (BS) equipped with no GPS receiver in the Ethernet system can be enabled to efficiently set an exact GPS time synchronization. As a result, a small size BS or a repeater can also be established in an urban downtown area or in an environment within a building where it is difficult to receive a GPS signal. While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. An apparatus for performing time synchronization by using Global Positioning System (GPS) information in a communication system, the apparatus comprising:
a grand-master node having a GPS receiver, and for generating a synchronizing message including Time Of Day (TOD) information received from the GPS receiver; and
at least one slave node for receiving the synchronizing message from the grand-master node for carrying out time synchronization operation by using an Offset and Frequency Compensation Clock (OFCC) synchronization process supporting time offset and frequency separation compensation said OFCC comprising:
checking a point in time when a relevant synchronizing message is received in relation to a point in time of previous frequency compensation when the synchronizing message is received from the master node, and confirming whether an interval between the point in time of the reception of the relevant synchronizing message and the point in time of the previous frequency compensation reaches a preset frequency compensation interval;
wherein only a time offset compensation operation is performed if it is confirmed that the interval does not reach the preset frequency compensation interval; and
both the time offset compensation operation and a frequency compensation operation are performed if it is confirmed that the interval reaches the preset frequency compensation interval.

2. The apparatus as claimed in claim 1, wherein the grand-master node having the GPS receiver comprises:
a Precision Time Protocol (PTP) generator for encapsulating the received TOD information in a PTP scheme;
a time stamp generator for generating a time stamp complying with the IEEE 1588 standard in the synchronizing message;
a time stamp checker for processing time-stamped information; and
a CPU for controlling each of configuration elements of the grand-master node.

3. The apparatus as claimed in claim 1, wherein the GPS receiver equipped within the grand-master node is configured in the form of one body with the grand-master node, or is configured in an add-on form having a separated form from the grand-master node.

4. The apparatus as claimed in claim 3, wherein the grand-master node having the GPS receiver configured in the add-on form performs a communication operation between the GPS receiver and the grand-master node by using an RS-232 port.

5. The apparatus as claimed in claim 1, wherein the slave node comprises:
a Precision Time Protocol (PTP) generator for encapsulating the TOD information in a PTP scheme in order to produce a synchronizing message;
a time stamp generator for generating a time stamp according to the IEEE 1588 standard in the synchronizing message
a time stamp checker for processing time-stamped information of a synchronizing message received;
a clock and timing generating unit for generating 1 Pulse Per Second (1 PPS), Pulse Per 2 Second (PP2S), and 10 MHz output signals by using the synchronized TOD information; and
a CPU for controlling each of configuration elements of the slave node, and for carrying out a time synchronization operation by using the OFCC synchronization process.

6. The apparatus as claimed in claim 5, wherein the slave node further comprises:
a Temperature-Compensated X-tal (crystal) Oscillator (TCXO) for providing an output signal having an oscillation frequency that is mechanically and physically stable.

7. The apparatus as claimed in claim 6, wherein the 10 MHz clock provided from the clock and timing generating unit corresponds to a digital 10 MHz clock synchronized by using an analog 10 MHz clock provided from the TCXO.

8. The apparatus as claimed in claim 5, wherein the 10 MHz clock provided from the clock and timing generating unit is used as a system synchronizing clock.

9. The apparatus as claimed in claim 1, wherein said at least one slave node further:
generating a synchronizing message required to synchronize time on other slave nodes.

10. A method for performing time synchronization by using Global Positioning System (GPS) information in a communication system, the method comprising the steps of:
generating a synchronizing message required to synchronize time on at least one slave node by using Time Of Day (TOD) information that a grand-master node having a GPS receiver receives from a GPS receiver, and transmitting the generated synchronizing message to the at least one slave node; and
receiving, by the at least one slave node, the synchronizing message, carrying out time synchronization operation by using an Offset and Frequency Compensation Clock (OFCC) synchronization process supporting time offset and frequency separation compensation, wherein the Offset and Frequency Compensation Clock (OFCC) synchronization process employed by the slave node comprises the steps of:
checking a point in time when the relevant synchronizing message is received in relation to a point in time of previous frequency compensation when the synchronizing message is received from the side of a master node, and confirming if an interval between the point in time of the reception of the relevant synchronizing message and the point in time of the previous frequency compensation reaches a present frequency compensation interval;
performing a time offset compensation operation if it is confirmed that the interval does not reach the preset frequency compensation interval; and
performs both the time offset compensation operation and a frequency compensation operation if it is confirmed that the interval reaches the preset frequency compensation interval.

11. The method as claimed in claim 10, wherein the synchronizing message that the grand-master node generates for time synchronization of the slave node is encapsulated in a PTP scheme by using the TOD information received from the GPS receiver, and is time-stamped according to the IEEE 1588 standard.

12. The method as claimed in claim 10, wherein time-stamped information of the synchronizing message that the slave node receives from the grand-master node or from another slave node is processed by the slave node according to the IEEE 1588 standard.

13. The method as claimed in claim 10, wherein the synchronizing message that the slave node generates for time synchronization of another slave node is encapsulated in a PTP scheme by using the TOD information of the slave node, and is time-stamped according to the IEEE 1588 standard.

14. The method as claimed in claim 10, wherein said at least one slave node further executes the step of:
generating a synchronizing message required to synchronize time on other slave nodes.

15. An apparatus comprising:
a Precision Time Protocol (PTP) generator for encapsulating time of day (TOD) information in a PTP scheme in order to produce a synchronizing message;
a time stamp generator for generating a time stamp according to the IEEE 1588 standard in the synchronizing message
a time stamp checker for processing time-stamped information of a synchronizing message received;
a clock and timing generating unit for generating 1 Pulse Per Second (1 PPS), Pulse Per 2 Second (PP2S), and 10 MHz output signals by using the synchronized TOD information; and
a CPU for carrying out a time synchronization operation by using an OFCC synchronization process wherein the OFCC synchronization process:
checks a point in time when the relevant synchronizing message is received in relation to a point in time of previous frequency compensation when the synchronizing message is received from the side of a master node. and confirms whether an interval between the point in time of the reception of the relevant synchronizing message and the point in time of the previous frequency compensation reaches a preset frequency compensation interval;
performs a time offset compensation operation if it is confirmed that the interval does not reach the preset frequency compensation interval; and
performs the time offset compensation operation and a frequency compensation operation if it is confirmed that the interval reaches the preset frequency compensation interval.

16. The apparatus as claimed in claim 15, further comprises:
a Temperature-Compensated X-tal (crystal) Oscillator (TCXO) for providing an output signal having an oscillation frequency that is mechanically and physically stable.

17. The apparatus as claimed, in claim 16, wherein the 10 MHz clock provided from the clock and timing generating unit corresponds to a digital 10 MHz clock synchronized by using an analog 10 MHz clock provided from the TCXO.

18. The apparatus as claimed in claim 15, wherein the 10 MHz clock provided from the clock and timing generating unit is used as a system synchronizing clock.

19. The apparatus as claimed In claim 15, wherein the TOD data is provided by a GPS.

20. The apparatus as claimed in claim 15, wherein said time compensation is determined as:
FreqScaleFactorn=MasterClockCountn/SlaveClockCountn.

21. The apparatus as claimed in claim 15, wherein said frequency compensation is determined as:

$$FreqScaleFactor_n = \frac{\sum_{i=n-m_n+1}^{n} MasterClockCount_i}{\sum_{i=n-m_n+1}^{n} SlaveClockCount_i} + \frac{ClockDiffCount_{n}}{SlaveClockCount_{n}}.$$

* * * * *